(12) United States Patent
Hofer et al.

(10) Patent No.: US 10,480,493 B2
(45) Date of Patent: Nov. 19, 2019

(54) HALL EFFECT THRUSTER ELECTRICAL CONFIGURATION

(71) Applicant: CALIFORNIA INSTITUTE OF TECHNOLOGY, Pasadena, CA (US)

(72) Inventors: Richard R. Hofer, Monrovia, CA (US); Benjamin A. Jorns, Ann Arbor, MI (US); Ira Katz, Pasadena, CA (US); John R. Brophy, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 320 days.

(21) Appl. No.: 15/474,480

(22) Filed: Mar. 30, 2017

(65) Prior Publication Data

US 2017/0284380 A1    Oct. 5, 2017

Related U.S. Application Data

(60) Provisional application No. 62/315,563, filed on Mar. 30, 2016.

(51) Int. Cl.
| | | |
|---|---|---|
| *F03H 1/00* | (2006.01) | |
| *B64G 1/40* | (2006.01) | |
| *H05H 1/54* | (2006.01) | |

(52) U.S. Cl.
CPC ........... *F03H 1/0075* (2013.01); *B64G 1/405* (2013.01); *F03H 1/0018* (2013.01); *F03H 1/0068* (2013.01); *H05H 1/54* (2013.01)

(58) Field of Classification Search
CPC .... F03H 1/0068; F03H 1/0075; F03H 1/0025; F03H 1/0018; F03H 1/0062; F03H 1/0037; F03H 1/0043; F03H 1/005; F03H 1/0056; B64G 1/405
See application file for complete search history.

(56) References Cited

U.S. PATENT DOCUMENTS

| | | | |
|---|---|---|---|
| 3,913,320 A | * | 10/1975 | Reader ................ F03H 1/0043 60/202 |
| 7,624,566 B1 | | 12/2009 | Manzella et al. |
| 8,143,788 B2 | | 3/2012 | Hofer et al. |
| 8,407,979 B1 | | 4/2013 | Hofer |
| 9,453,502 B2 | | 9/2016 | Goebel et al. |
| 9,934,929 B1 | * | 4/2018 | Martinez ............... F03H 1/0075 |
| 10,082,133 B2 | | 9/2018 | Goebel |
| 2009/0058305 A1 | * | 3/2009 | Hofer .................... B64G 1/405 315/111.91 |

(Continued)

OTHER PUBLICATIONS

Brophy, et al., "Dawn Ion Propulsion System: Initial Checkout after Launch", AIAA-2008-4917, Journal of Propulsion and Power, vol. 25, No. 6, Nov.-Dec. 2009, 1189-1202.

(Continued)

*Primary Examiner* — Gerald L Sung
*Assistant Examiner* — William L Breazeal
(74) *Attorney, Agent, or Firm* — Steinfl + Bruno LLP

(57) ABSTRACT

A Hall thruster is configured to reduce or eliminate pole erosion by electrically tying the cathode to the thruster chassis body. The electrical connection controls the ion energy hence reducing erosion at the pole. In a different configuration, the cathode is biased by a power supply, allowing further control of the ion energy and the elimination of pole erosion, thus increasing the thruster's operational lifetime.

18 Claims, 11 Drawing Sheets

(56) References Cited

U.S. PATENT DOCUMENTS

2013/0026917 A1* 1/2013 Walker .............. F03H 1/0075
315/85
2014/0053531 A1 2/2014 Goebel et al.

OTHER PUBLICATIONS

Goebel, et al, "Pole-Piece Interactions with the Plasma in a Magnetically Shielded Hall Thruster," AIAA Paper 2014-3899, Propulsion and Energy Forum, Jul. 28-30, 2014. 1-7.

Hofer, et al., "Electrical Configuration Effects in Magnetically Shielded Hall Thrusters", PowerPoint presentation, Feb. 18, 2016. 26 pages.

Hofer, et al, "Finite Pressure Effects in Magnetically Shielded Hall Thrusters," AIAA Paper 2014-3709, AIAA Propulsion and Energy Forum, Jul. 28-30, 2014. pp. 1-32.

Hofer, et al, "Magnetic Shielding of a Laboratory Hall Thruster Part II: Experiments," Journal of Applied Physics 115, 043303 (Jan. 2014), 14 pages.

Hofer, et al, "The 12.5 kW Hall Effect Rocket with Magnetic Shielding (HERMeS) for the Asteroid Redirect Robotic Mission," AIAA-2016-4825, AIAA Propulsion and Energy Forum, Jul. 25-27, 2016, Salt Lake City, UT, pp. 1-20.

Hofer, et al., "Wear Test of a Magnetically Shielded Hall Thruster at 3000 Seconds Specific Impulse," Presented at the 33rd International Electric Propulsion Conference, IEPC-2013-033, Washington, DC, Oct. 6-10, 2013, pp. 1-24.

Jorns, et al., "First results from Thruster Chassis Biasing Experiments with H6MS", PowerPoint presentation Mar. 8, 2016. 7 pages.

Jorns, et al., "H6MS Chassis Electrical Configuration Test Readiness Review", Powerpoint presentation, Feb. 26, 2016. 62 pages.

Jorns, et al., "Mechanisms for Pole Piece Erosion in a 6-kW Magnetically-Shielded Hall Thruster," AIAA-2016-4839, AIAA Propulsion and Energy Forum, Jul. 25-27, 2016, Salt Lake City, UT. 52nd AIAA/SAE/ASEE Joint Propulsion Conference, pp. 1-21.

Katz, et al, "Effect of Solar Array Plume Interactions on Hall Thruster Cathode Common Potentials," Presented at the 14th Spacecraft Charging Technology Conference, ESA/ESTEC, Noordwijk, NL, Apr. 4-8, 2016.

Kerslake, et al, "Development and Flight History of the SERTII Spacecraft", Journal of Spacecraft and Rockets, vol. 30, No. 3, pp. 258-290, May-Jun. 1993.

Mikellides, et al, "Magnetic Shielding of a Laboratory Hall Thruster Part I: Theory and Validation," Journal of Applied Physics 115, 043303 (Jan. 2014), pp. 1-20.

Mikellides, et al., "Magnetic Shielding of Walls from the Unmagnetized Ion Beam in a Hall Thruster," Applied Physics Letters 102, 2, 023509 (Nov. 2013), pp. 1-5.

Sekerak, et al, "Wear Testing of a Magnetically Shielded Hall Thruster at 2000 S Specific Impulse," Presented at the 34th International Electric Propulsion Conference, IEPC-2015-155, Kobe, Japan, Jul. 6-10, 2015, pp. 1-37.

* cited by examiner

HALL EFFECT THRUSTER ELECTRICAL CONFIGURATION

CROSS REFERENCE TO RELATED APPLICATIONS

The present application claims priority to U.S. Provisional Patent Application No. 62/315,563, filed on Mar. 30, 2016, the disclosure of which is incorporated herein by reference in its entirety.

STATEMENT OF INTEREST

The invention described herein was made in the performance of work under a NASA contract NNN12AA01C, and is subject to the provisions of Public Law 96-517 (35 USC 202) in which the Contractor has elected to retain title.

TECHNICAL FIELD

The present disclosure relates to spacecraft thrusters. More particularly, it relates to a Hall effect thruster electrical configuration.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

SUMMARY

Figure 1:
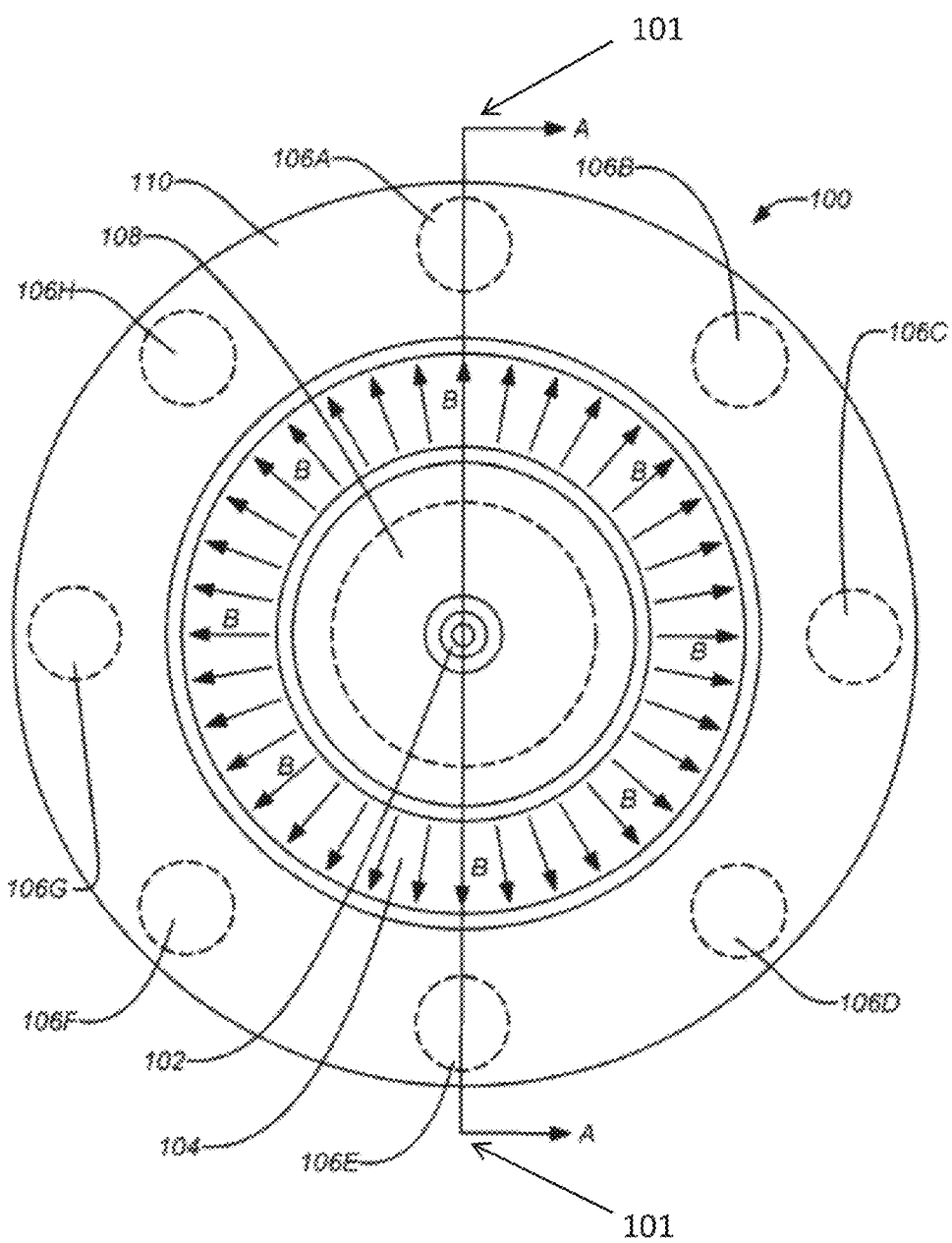
FIGS. 1 and 2 illustrate an exemplary I-fall thruster system on a spacecraft.

In a first aspect of the disclosure, a Hall thruster is described, comprising: a thruster body comprising an annular discharge chamber having an inner wall, the entire inner wall being made of a first electrically conductive material and having a rear surface with an aperture in the inner wall defined therein; said inner wall of said annular discharge chamber having a downstream end, a radially inner surface, and a radially outer surface, wherein said radially inner surface and said radially outer surface respectively radially inwardly and radially outwardly bound said annular discharge chamber; an anode/gas distributor having an anode electrical terminal, said anode/gas distributor situated in said aperture defined in said rear surface of said annular discharge chamber, said anode/gas distributor having at least one inlet configured to receive an ionizable gas and configured to distribute said ionizable gas for use as a propellant; a cathode neutralizer configured to provide electrons, said cathode neutralizer having a cathode electrical terminal that can be connected to said anode electrical terminal by way of a first power supply and a switch, said cathode neutralizer and said anode/gas distributor when operating generating an axial electrical field within said annular discharge chamber; and a magnetic circuit having a magnetic yoke, an inner magnetic coil and an outer magnetic coil, said magnetic circuit configured to be switchably powered, said magnetic circuit configured to provide a substantially radial magnetic field across an annular aperture of said annular discharge chamber, said magnetic circuit configured to provide magnetic shielding of said inner wall of said annular discharge chamber from high-energy ions, wherein the cathode electrical terminal is electrically connected to the thruster body by way of a second electrically conductive material, thereby electrically biasing the thruster body to an electrical potential level of the cathode electrical terminal.

DETAILED DESCRIPTION

Hall effect thrusters are a type of electric propulsion used in multiple commercial, military, and civil applications. The development of these devices requires careful attention to the manner in which they are tested on the ground and the particular details that enable their operation for the many thousands of hours of operation which are necessary for typical space missions.

One particular ground test effect is the conduction of current through the thruster chassis or body. Current conducted through the chassis may not be present in a space environment, and the absence of that current has the potential to de-stabilize the discharge, induce high thermal loads, and reduce thruster lifetime. Chassis current is typically limited in existing Hall thrusters that are flown in space through the use of insulating coatings on the pole piece faces that are exposed to the relatively dense, relatively high temperature plasma in front of the thruster.

The lifetime of Hall thrusters has typically been limited by erosion of their discharge chamber walls, but this can be greatly extended through the use of magnetic shielding (see for example U.S. Pat. No. 9,453,502, "Metallic Wall Hall Thrusters", the disclosure of which is incorporated herein by reference in its entirety). Experiments conducted at the Jet Propulsion Laboratory have shown how magnetic shielding, while increasing discharge chamber lifetimes by orders of magnitude, can also create conditions near the pole piece faces that cause significant erosion. These erosion rates are high enough that most insulating coatings can no longer be used because they do not provide a high enough sputter resistance to ion bombardment. The erosion process leads to the use of conducting coatings with low sputter yields, such as graphite.

Most existing Hall thrusters using insulating coatings are not magnetically shielded by virtue of their magnetic field topology, and are referred to as unshielded Hall thrusters. These thrusters have lifetimes of just a few thousand hours, limited by the erosion of their discharge chamber walls, which eventually exposes the pole pieces and leads to their sputtering and subsequent failure. Methods to protect the pole pieces of unshielded Hall thrusters are also highly desirable, as this could greatly extend the lifetime of many existing Hall thrusters currently flown in space in commercial, military, and civil applications.

Hall thrusters typically operate at 300-400 V in space. Achieving a so-called high-voltage Hall thruster that operates at greater than 400 V is significantly complicated by increased electron transport, which reduces efficiency, as well as the increase in ion energy, which increases sputtering and reduces lifetime. It would be highly desirable to achieve thruster configurations that enable high-voltage operation and long lifetime. There are no known solutions for achieving high-voltage, long-lifetime operation in a Hall thruster and that are also qualified for space flight.

As described in the present disclosure, the ground test and lifetime issues can be eliminated through an electrical configuration of the Hall thruster that addresses both. Multiple implementations are possible and some examples in particular are described herein.

In a first implementation, the thruster chassis (body) is electrically biased to the potential of the cathode (i.e, cathode common). This configuration requires that the thruster chassis is electrically isolated from the ground test facility or spacecraft (although a resistor between the spacecraft and thruster chassis may be used to control this coupling in practice, depending on the specific application). The electrical isolation eliminates the undesirable facility effects that are not present on orbit. This is true whether or not the thruster has conducting pole covers and regardless of the cathode location (external to the magnetic circuit or mounted on the thruster centerline). Biasing to the cathode potential also effectively controls the energy of the ions impacting the pole covers to a known value, which is just 10-15 V more than the bulk plasma existing near the pole faces. This limits the amount of erosion that can occur on these surfaces and allows lifetimes of several tens of thousands of hours to be achieved.

In a second implementation, the thruster chassis is biased relative to the cathode common using a power supply. This arrangement requires the use of a small power supply in the power electronics, but the added complexity has significant advantages. For example, one advantage is the ability to directly control the energy of the ions impacting the pole pieces, which can essentially eliminate erosion of these surfaces. When coupled with magnetic shielding and long-life cathodes, the lifetime of the thruster could exceed 100,000 hours. A bias power supply would also allow for control of the thruster interactions with the ambient plasma, depending on the conditions in which the spacecraft was flying. The capacity to exercise this control would be especially advantageous in charged atmospheres or other extreme environments.

Both of the above implementations may be implemented in shielded or unshielded Hall thrusters and in low- or high-voltage Hall thrusters. The control of body currents is important to eliminating ground test facility effects so that the thruster operates in space as it does on the ground.

Biasing the thruster to the cathode common is relatively simple. In order to establish an electrical connection, a wire can be attached from the chassis to the cathode body (i.e., cathode common), for example either at the thruster itself or in the power electronics. The variable bias approach would require an auxiliary power supply in the power electronics that allows for biasing the thruster body relative to cathode common.

In both approaches, the thruster chassis is electrically isolated from the vacuum facility ground (as in ground testing) or the spacecraft (for space operation). In an actual spacecraft, a resistor is typically connected between the cathode common and the spacecraft common in order to balance the electron current collected by the solar arrays. The use of either of these techniques provides for an additional level of control of the conditions that the thruster and spacecraft experience.

The approaches described herein have never been applied to the magnetic layer Hall thrusters described above. Magnetic layer Hall thrusters are distinguished by the use of a specific magnetic field topologies interacting with the confining walls of the discharge chamber (whether conducting or insulating), to produce an extended acceleration layer that is especially conducive to thruster stability and long-life. Magnetic layer Hall thrusters are the only class of Hall thrusters that are actually flown in space. These thrusters typically have ceramic discharge chambers with insulating pole covers, but may also have conducting discharge chambers as described in U.S. Pat. No. 9,453,502, "Metallic Wall Hall Thrusters.", the disclosure of which is incorporated herein by reference in its entirety. The innovation disclosed herein is entirely unique to this class of Hall thrusters and will greatly increase the life of unshielded Hall thrusters factors of 2-5×), realize the potential of magnetically shielded Hall thrusters (10-100× greater lifetimes than unshielded Hall thrusters), and allow for high-voltage operation.

Hall thrusters are generally tested in vacuum chambers during their development, instead of in space. The finite pumping speed of the vacuum chamber will maintain a pressure that is still orders of magnitude higher than experienced during operation in space. These differences need to be taken into account when evaluating the performance of a Hall thruster design. Therefore, measurements can be taken of the electrical characteristics of a Hall thruster, for different electrical configurations of the thrust stand and thruster body. By these measurements it is possible to identify the location where electric current is collected on the thruster body, and therefore determine which combination of electrical configurations is most representative of on-orbit conditions.

For example, a Hall thruster may be tested with non-covered pole pieces, or it may be tested with covered pole pieces. The pole pieces are typically made from a soft magnetic material such as iron, that is also electrically conductive. These pole pieces may be covered with boron nitride, alumina, or other electrically insulating material. During testing, the thruster body and thrust stand are electrically isolated from electrical ground and each other. Electrical insulation is typically verified up to 1000 V at atmosphere and periodically checked during vacuum testing. Different discharge power, voltage and current can be tested for each Hall thruster design. For example, the discharge power may be in the kilowatt range, the voltage in the hundreds of volts range, and the current in the tens of amperes range. The thruster body can be set as grounded or floating. The design of the thruster may be with an internal or external cathode. The voltage and current for the different configurations was tested and it was found that the isolated thruster body collected a higher current with an external cathode.

During testing, it was verified that the thrust stand collects only a few milli-amperes of current and is not participating in the discharge in any significant way. Isolating the thrust stand, electrically or with external insulation, does not appear to be necessary. During testing, the current collection on the thruster body has been shown to be primarily through the downstream facing surfaces of the non-covered pole pieces. This current collection is dominated by electrons and is the result of high density, high temperature plasma being in contact with the conductor. The following considerations can be made: An insulator has the same zero current boundary condition as a floating conductor; The thruster operates in a similar manner with a floating conductor or the pole covers; The floating potential of the conductor is very similar to the insulator sheath. It can therefore be deduced that the pole cover material can be selected on sputtering considerations alone. Therefore, the material with the higher erosion resistance can be chosen. For example, graphite can be used for the pole covers, since insulating covers have higher erosion rates. The present disclosure describes how a "cathode-tied" configuration is advantageous for magnetically shielded Hall thruster in particular, and Hall thrusters with conducting pole pieces in general.

Excessive ion energy can result in excessive erosion rates at the poles. The ion energy can be limited by electrically tying the thruster body to the cathode potential, which should limit the increase in ion energy to 10-15 V. Floating the thruster body may be more representative of on-orbit operation, however this configuration may be increasing ion erosion of the poles to unacceptably high values. Therefore, in some embodiments, an advantageous configuration has graphite pole covers, with the chassis body electrically tied to the cathode potential. In this configuration, the cathode floats with regard to the electrical ground during ground testing or the spacecraft common potential on-orbit.

As understood by the person of ordinary skill in the art, a Hall thruster generally comprises magnetic and electric field generators. For example, a Hall thruster may comprise magnetic pole pieces that generate a magnetic field. The magnetic poles may have a circular cross-section. A gas propellant, such as a noble gas, is emitted from a nozzle. Typically, the anode is also part of, or adjacent to, the gas nozzle. A cathode can be placed in different positions depending on the specific thruster configuration. The cathode and the anode establish an electric field, typically between the magnetic poles. The electric field accelerates the gas ions (for example, Xe), generating thrust. The electron current from the cathode is split in a component towards the anode, and a component neutralizing the ions away from the thruster.

Figure 2:
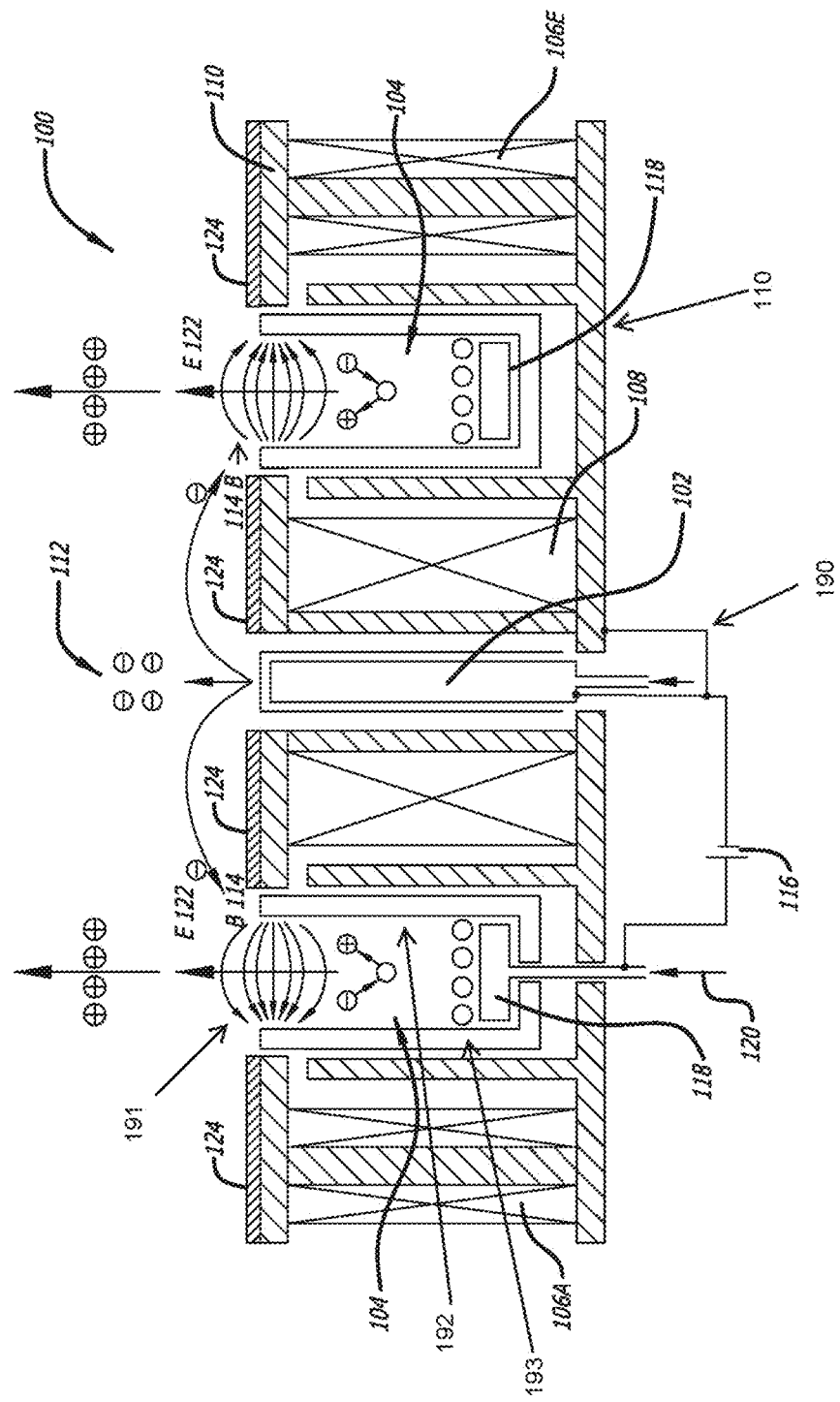

FIGS. 1 and 2 are schematic diagrams of an exemplary Hall effect thruster (100), employing a central electron emitting cathode (102). In other embodiments, the cathode may be positioned away from the center of the circular cross-section. FIG. 1 shows a top view of the thruster and FIG. 2 shows a cross section along points A (101) of FIG. 1. The thruster (100) employs an annular cavity (104) for ionizing and accelerating gas particles which are ejected from the cavity to develop thrust. A magnetic (B) field is developed radially (from the center to the outer rim) across the open end of the annular cavity (104), for example with electromagnets. Typically, a magnetic circuit is formed using multiple electromagnetic coils (106A-106H), (108) and a ferrous housing (110) appropriately constructed to produce the magnetic field as shown in FIGS. 1 and 2. In the example thruster (TOO), eight outer electromagnetic coils (106A-106H) and one larger central electromagnetic coil (108) are employed although those skilled in the art will appreciate that any combination of coil number and sizes may be employed as necessary to develop the proper magnetic field strength and shape.

Referring to FIG. 2, the centrally mounted electron emitter cathode (102) emits electrons (112) from an opening around a same level as that of the openings in the annular cavity (104) (the electrons are illustrated as circular symbols with a negative sign). In other words, in some embodiments, the opening of the cathode lies in the same plane of the opening of the annular cavity (104). Positioning the cathode in this way reduces keeper sputtering of the cathode (102), which can increase as the cathode (102) is extended beyond the plane of the opening of the annular cavity (104). Performance can be optimized by iteratively adjusting the cathode (102) end extension position beyond the opening of the annular cavity (104) and testing each configuration. In this example, the cathode (102) is disposed in the center of the single large central coil (108) for developing the magnetic field B (114).

The electrons (112) from the emitter cathode (102) are drawn to the annular cavity (104) by a voltage (116) between the cathode (102) and at least one anode (118) disposed at the bottom of the annular cavity (104). Movement of the electrons (112) drawn to the annular cavity (104) is influenced by the magnetic field (114) such that the electrons become trapped and spiral around the annular cavity (104). Typically, the anode (118) is also used to deliver a gas (120) (e.g. xenon) which flows through it to the bottom of the annular cavity (104) (illustrated as neutral circular symbols above the anode 118). The downstream side of the trapped cloud of electrons (112) in the annular cavity (104) forms a "virtual" cathode, an electrical extension of the central cathode (102). An electric (E) field (122) is defined from the anode (118) to this "virtual" cathode in a vertical direction out of the annular cavity (104). Energized electrons (112) in the annular cavity 104 also impact and ionize the gas (120). The gas (120) ions (illustrated as circular symbols with a positive sign) are driven by the electric field (122) and expelled out of the annular cavity (104) imparting a reactive force to the thruster (100) in the opposite direction. Some additional electrons (112) from the cathode (102) are attracted by the expelled gas (120) ions and drawn out with them, where they neutralize the ion beam.

It should be noted that the foregoing description of the electron emitter cathode (102) operating in the Hall effect thruster (100) is only one example use for the cathode (102) embodiment of the invention which demonstrates the cathode (102) disposed in the center of the annular cavity (104). Other applications and uses will be apparent to those skilled in the art based on the detailed description including key elements of the structure and method of operation of the cathode (102) as described in the following sections. A typical element of the electron emitter cathode is the rare earth insert which is the source of the electron emission.

In some embodiments, the cathode (102) is electrically tied to the thruster chassis through electrical connection (190). In other embodiments, a power supply can be placed at (190) to electrically bias the cathode with respect to the thruster body. In some embodiments, pole covers (124) can be added. For example, the pole covers can be insulating or conducting. In some embodiments, the pole covers (124) are made of graphite.

FIGS. 1-2 depict a thruster using outer coils that are arranged around the outside of the discharge chamber. In other embodiments, a single outer coil goes around the outside of the discharge chamber. This configuration changes part of the magnetic circuit.

In a Hall thruster, the propellant is accelerated by the electric field. The electrons are trapped in the magnetic field and used to ionize the propellant and neutralize the ions in the plume. The magnetic poles can be subject to erosion from sputtering, therefore pole covers are advantageous. Generally, conducting or insulating pole covers can be used. Since insulating covers generally have higher erosion rates, Hall thrusters as described herein can advantageously have, in some embodiments, conducting pole covers, for example made of graphite.

Figure 3:
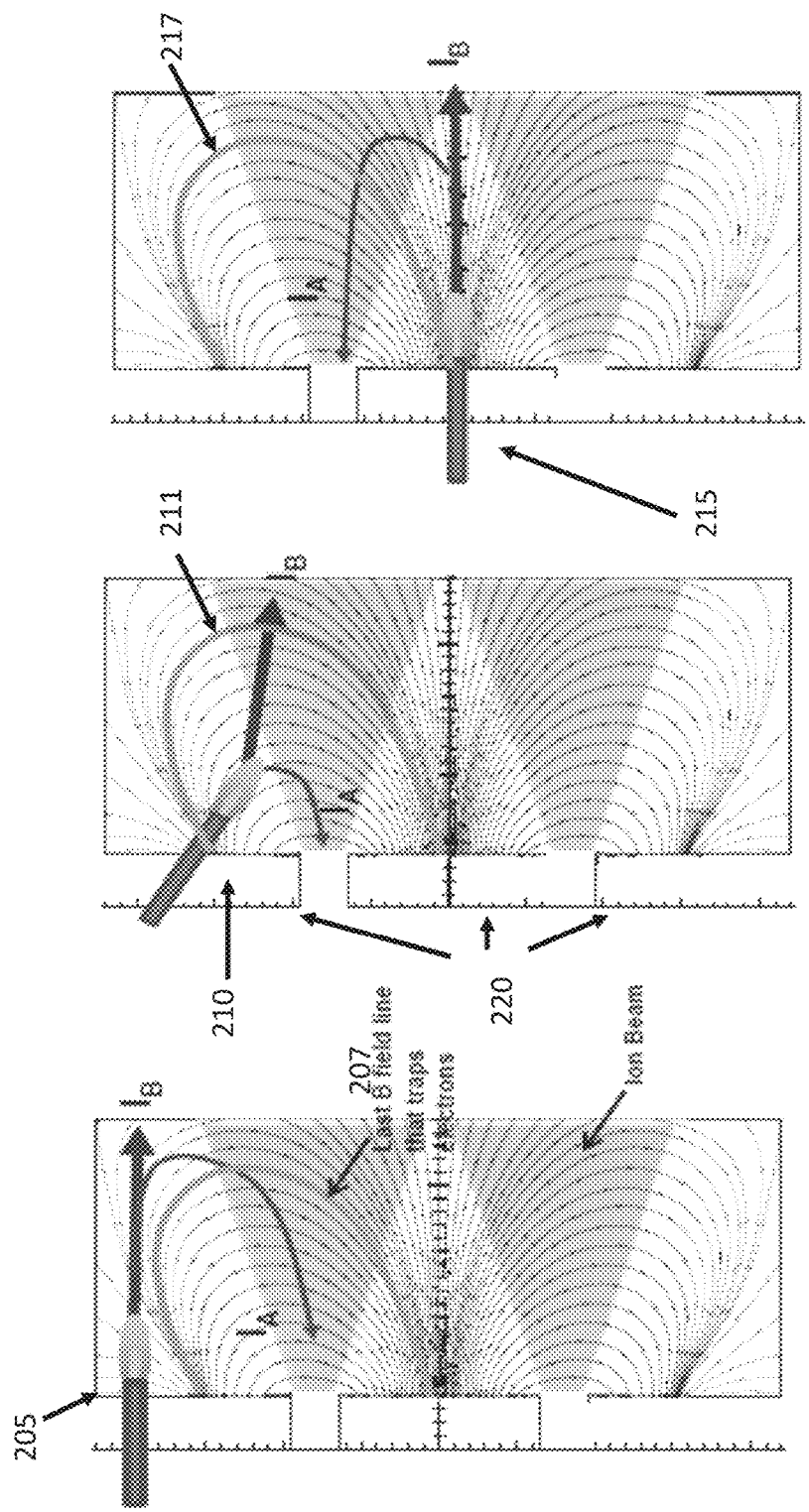
FIG. 3 illustrates exemplary cathode placements.

FIG. 3 illustrates different exemplary cathode configurations. For the different configurations, the cathode is placed at different locations with respect to the separatrix, that is the region of the magnetic fields lines which forms a boundary between the region where an electron is trapped by the magnetic field, and the region where the electron is not trapped. In FIG. 3, the separatrix is plotted with a thicker line (207,211,217). When the external cathode is on the external side of the separatrix (205), it is easier for the electrons to neutralize the ion beam but more difficult for the electrons to enter the channel between the magnetic poles. When the cathode is on the internal side of the separatrix (210), it is more difficult for the electrons to neutralize the ion beam but easier for the electrons to enter the channel between the magnetic poles. In the internal cathode configuration (on thruster centerline, 215), it is easy for the electrons to neutralize the ion beam and easier for the electrons to enter the channel between the magnetic poles. Generally, about ¾ of the electrons neutralize the beam while about ¼ is collected at the anode.

During testing, a significant current was measured flowing from thruster chassis to the chamber electrical ground. Since no ground level is present in space, insulating pole covers were applied, which eliminated the greater part of this current. In this way, it was possible to develop a testing methodology that allows object performance testing of the thruster in conditions that are more similar to the actual operating conditions in space. Therefore, the best configuration that allows testing of the thruster was found to be either floating or insulated from ground. Specifically, it was determined that electrically floating the thruster body was the best representation of space conditions in flight. It was also determined that, while small changes occur in the current, between the insulated and floating configuration, there were no significant repercussions with regard to the thruster stability when the floating configuration was used.

During testing, it was determined, however, that the floating configuration caused erosion at the poles, from ion sputtering. This was due to the fact that the floating level was well below the testing facility ground and the cathode floating potential, which would increase the energy of ions impacting the thruster chassis. This increase in ion energy meant the pole covers would need to be significantly thicker if long-lifetime were to be achieved. Therefore, additional testing was conducted to determine a configuration that would be representative of flight conditions while not adversely affecting the pole erosion rate.

Specifically, it was found that the ion energy could be limited by tying the thruster body to the cathode potential. In this way, the thruster still floats as the cathode common is floating (therefore being representative of flight conditions), while the excess electron current can be collected at the poles and re-emitted at the cathode. The potential drop from the plasma to the pole will still be greater than with the grounded configuration but is reduced compared to the floating configuration by several tens of volts.

To test the above configuration and demonstrate the viability of connecting chassis to cathode, the testing set up quantified the current to the thruster chassis as a function of bias voltage, as well as the time-dependent behavior of electrical and plasma properties, and the time-averaged ion velocity. The results validate the hypothesis that tying the thruster chassis to the cathode represents an intermediate case between grounded and floating configurations. This configuration provides for flight-like electrical environments while limiting the ion energy to levels that are expected to be mitigated by pole covers.

The configuration described in the present disclosure is advantageous for the development of Hall thrusters that have large operating envelopes. For example, the Hall Effect Rocket with Magnetic Shielding (HERMeS) has an operating envelope spanning 300-800 V, 8.9-31.3 A, and 6.25-12.5 kW. However, such an operating envelope needed to be tested for stability. As described above in the present disclosure, the electrical configuration has a high chassis potential which implied enhanced pole erosion. Cathode-tying was implemented as a solution. The cathode-tied configuration was then tested and found to be stable. The cathode-tied operation was also demonstrated to be stable with graphite pole covers. In particular, the cathode-tied graphite cover configuration was compared, during an extended wear test (in the hundreds of hours), with a floating alumina cover configuration.

It can be noted that, with a grounded chassis, a parasitic current flows from the chassis through to the vacuum chamber to neutralize the ion beam. This current would not be present in orbit. With a floating chassis, the chassis must float to a negative level to reject the hot plasma contacting the poles, which increases the energy of ions impacting the poles. A higher ion energy significantly increases pole erosion. With a cathode-tied chassis, the current collected by the poles is recycled by the cathode, and the ion energy is regulated by the cathode potential.

Figure 4:
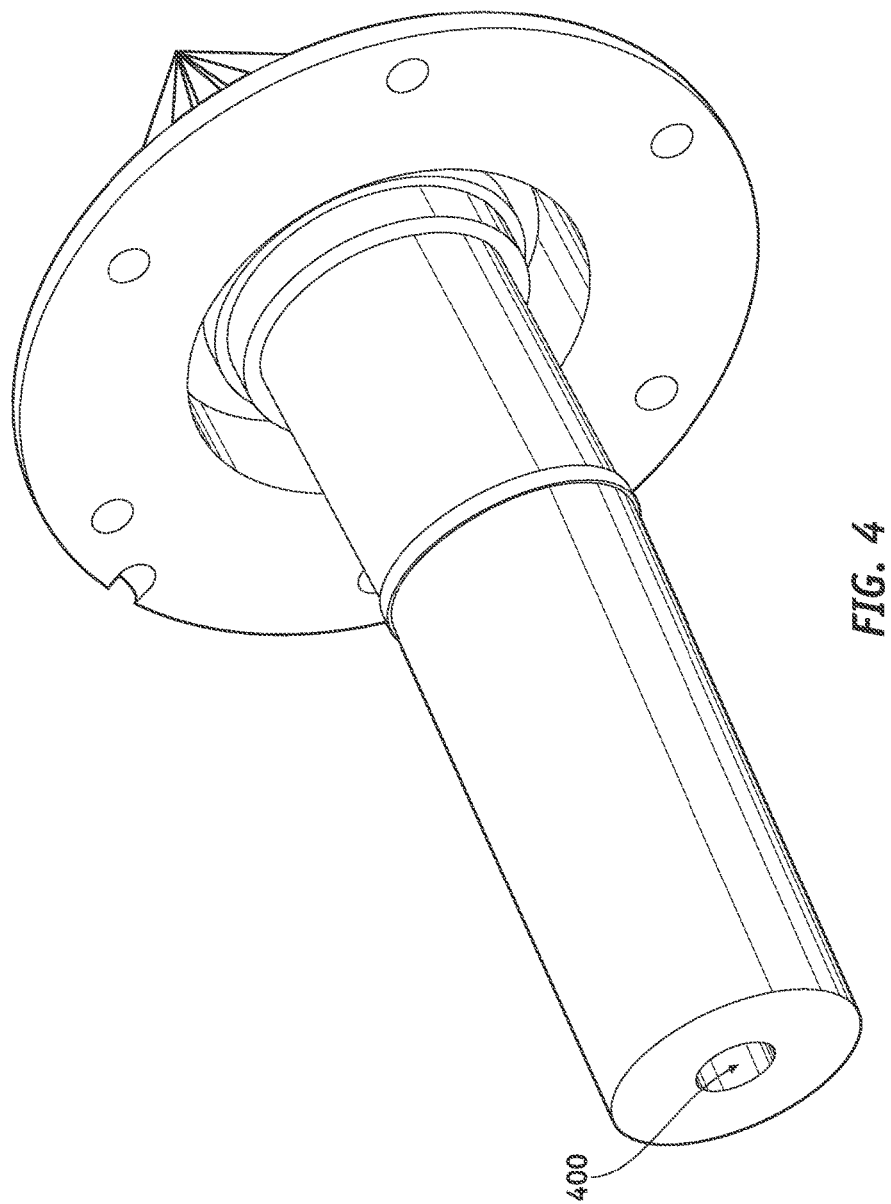
FIG. 4 illustrates an exemplary cathode assembly.

In some embodiments, a hollow cathode can be used, for example made of BaO or $LaB_6$. BaO has large current throttling capabilities, while $LaB_6$ is more tolerant to propellant impurities and high current operations. FIG. 4 illustrates an exemplary cathode assembly. The cathode has a hollow cylindrical shape, with the hole (400) extending longitudinally throughout the structure.

Figure 5:
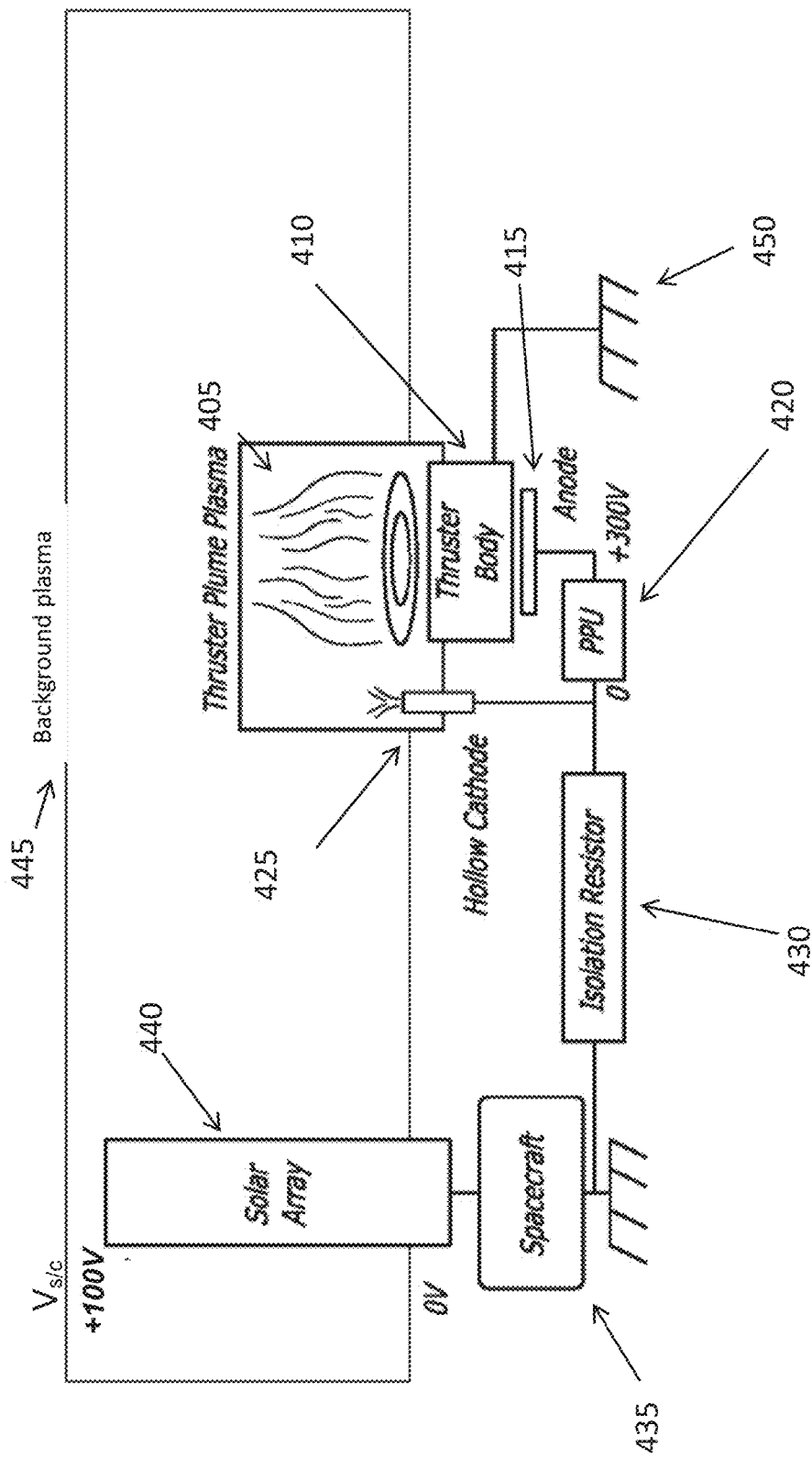
FIG. 5 illustrates an exemplary Hall thruster system on a spacecraft.
Figure 6:
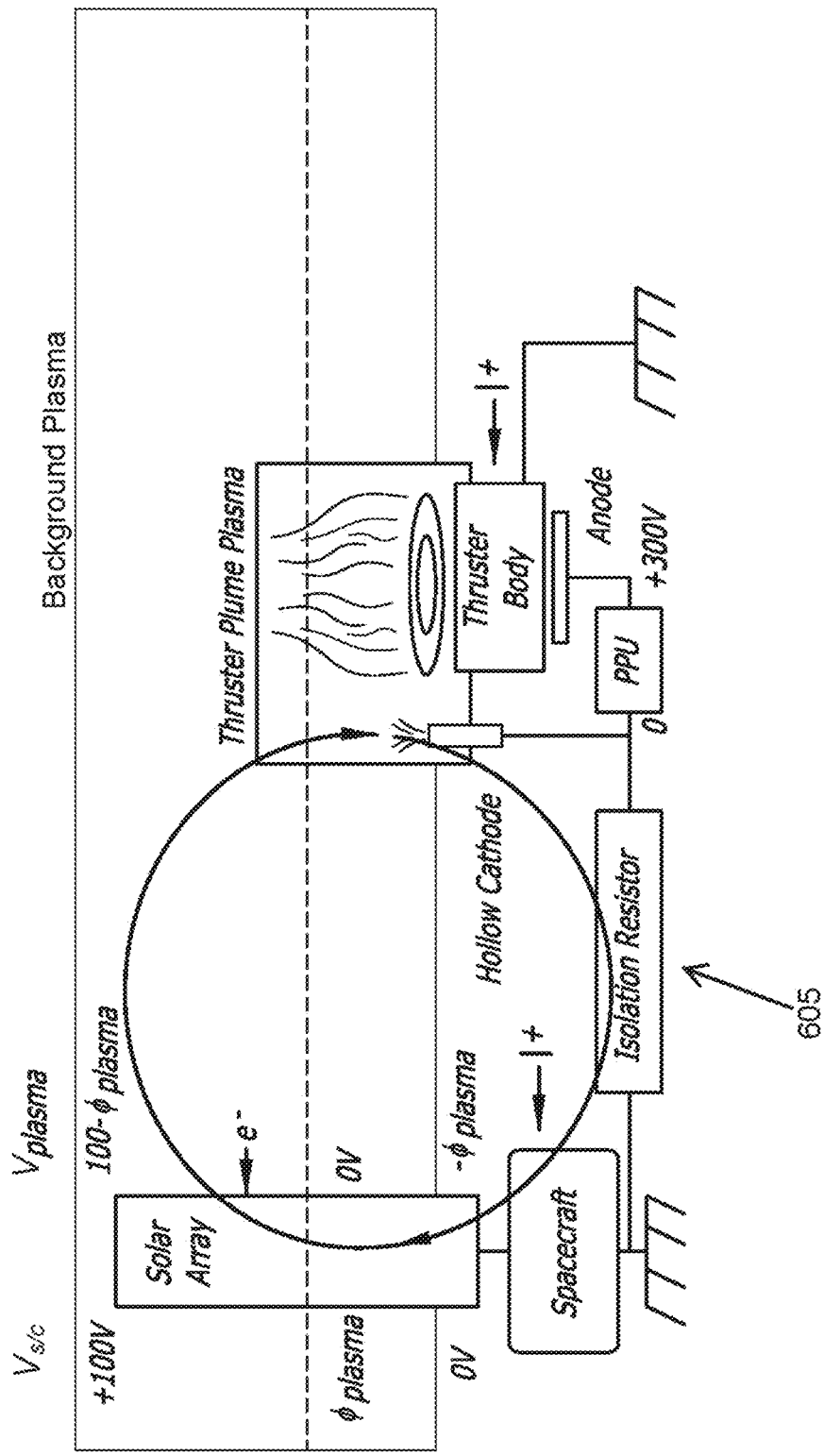
FIG. 6 illustrates a cathode common circuit for a Hall thruster system with insulating pole piece surfaces.
Figure 7:
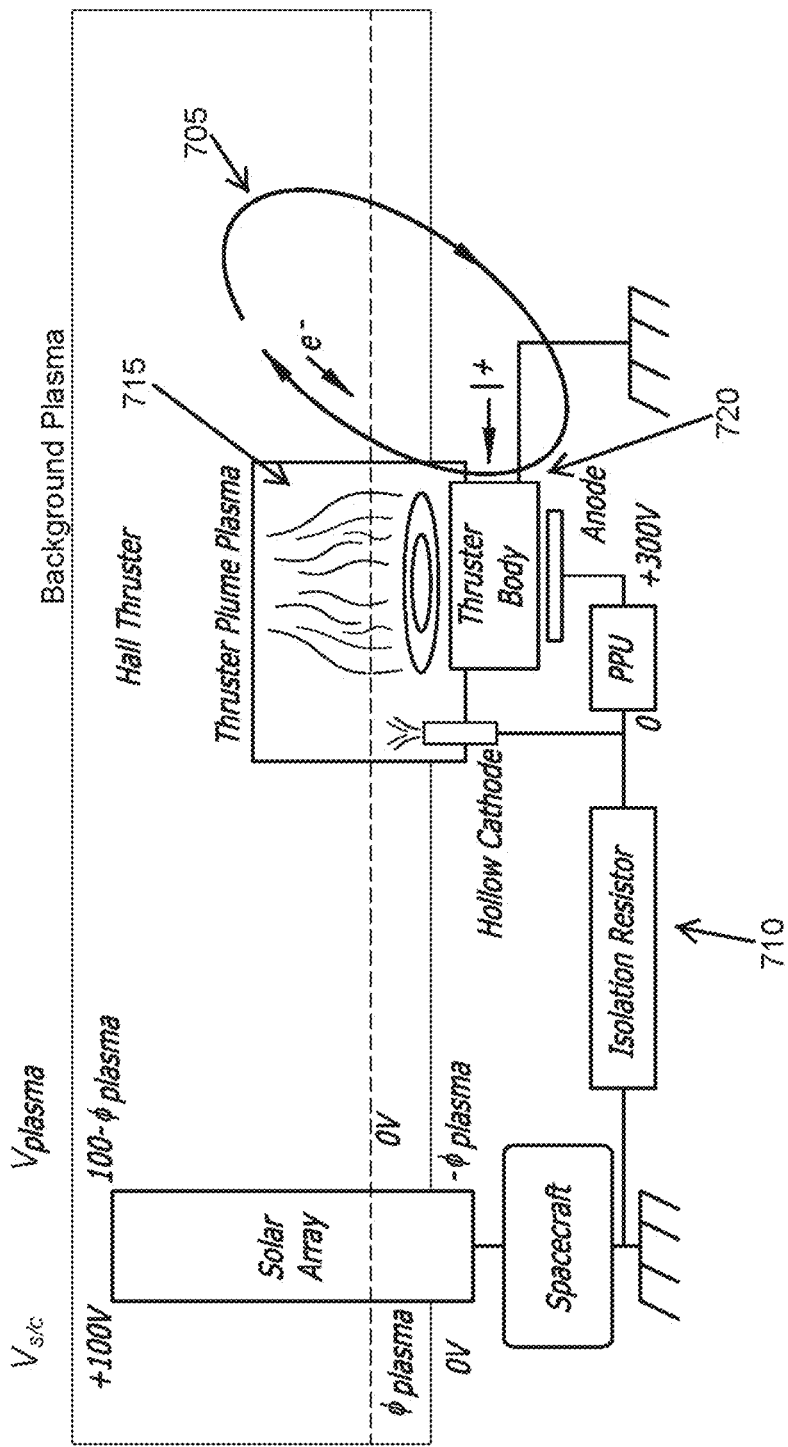
FIG. 7 illustrates a Hall thruster system conducting pole pieces where the current loop through the thruster body closes in the plume plasma.
Figure 8:
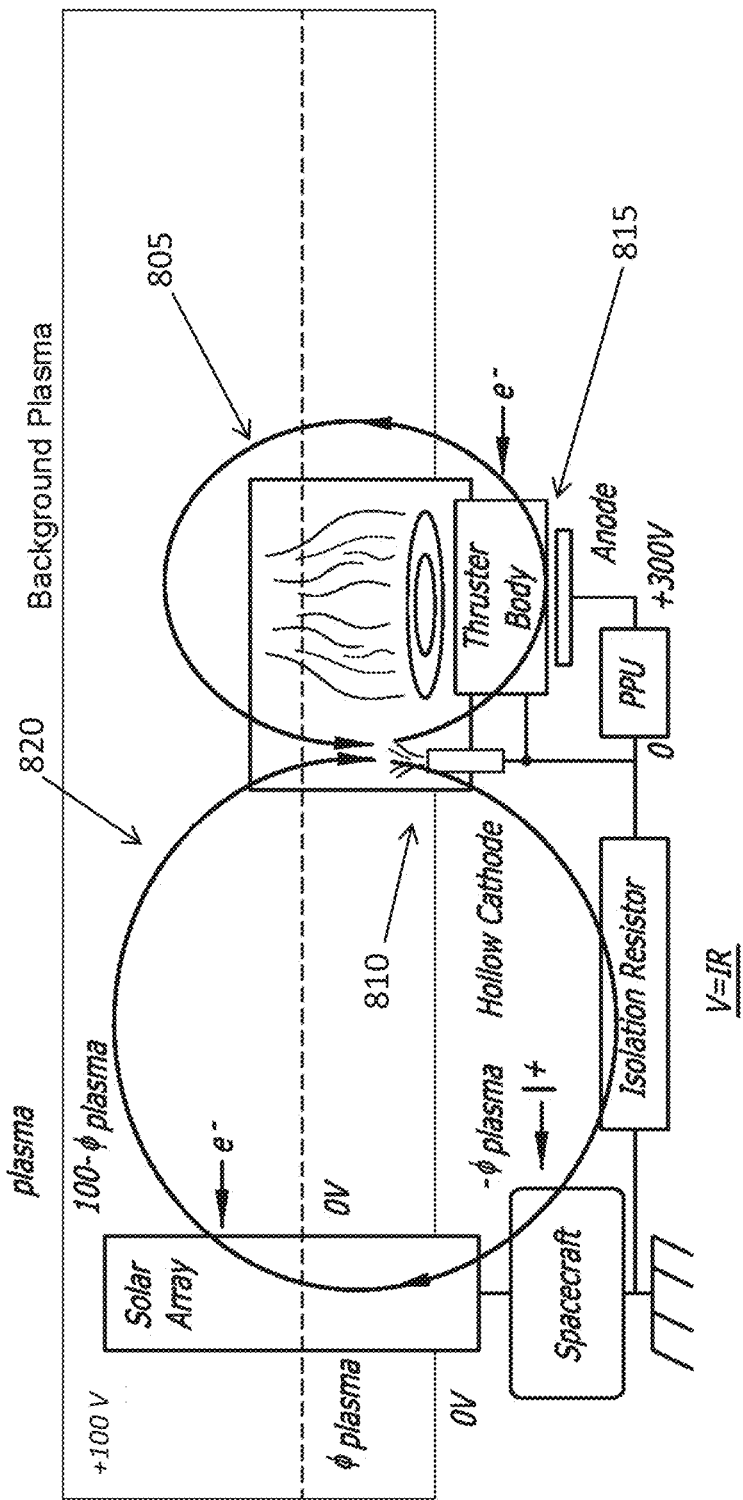
FIG. 8 illustrates current loops for a Hall thruster system with conducting pole pieces and the thruster body at cathode common.

The following considerations have been discussed also in Ref. [9]. A simplified diagram of a Hall thruster system on a spacecraft is shown in FIG. 5. It can be noted that the thruster body (410) is connected to the spacecraft chassis ground (450). In some embodiments, the chassis body is biased with a power supply (420) so as to completely nullify the ion impact energy. Also schematically illustrated are the spacecraft (435) and its solar array (440), as well as a hollow cathode (425), the thruster plume plasma (405), the thruster anode (415), the isolation resistor (430) and a background plasma volume (445) outside the spacecraft. In FIGS. 6-8, several elements of FIG. 5 are reproduced.

In the following, three electrical configurations of Hall thrusters are discussed: 1.) an insulating surface on the pole pieces, and the thruster body electrically tied to the spacecraft chassis (i.e., spacecraft electrical common or sic), 2.) exposed conducting pole pieces and the thruster body electrically tied to the spacecraft chassis, and 3.) exposed conducting pole pieces and the thruster body tied to cathode common. In each of the cases the analysis is for a centrally mounted hollow cathode and generalization of the results to externally mounted cathodes is discussed.

Figure 9:
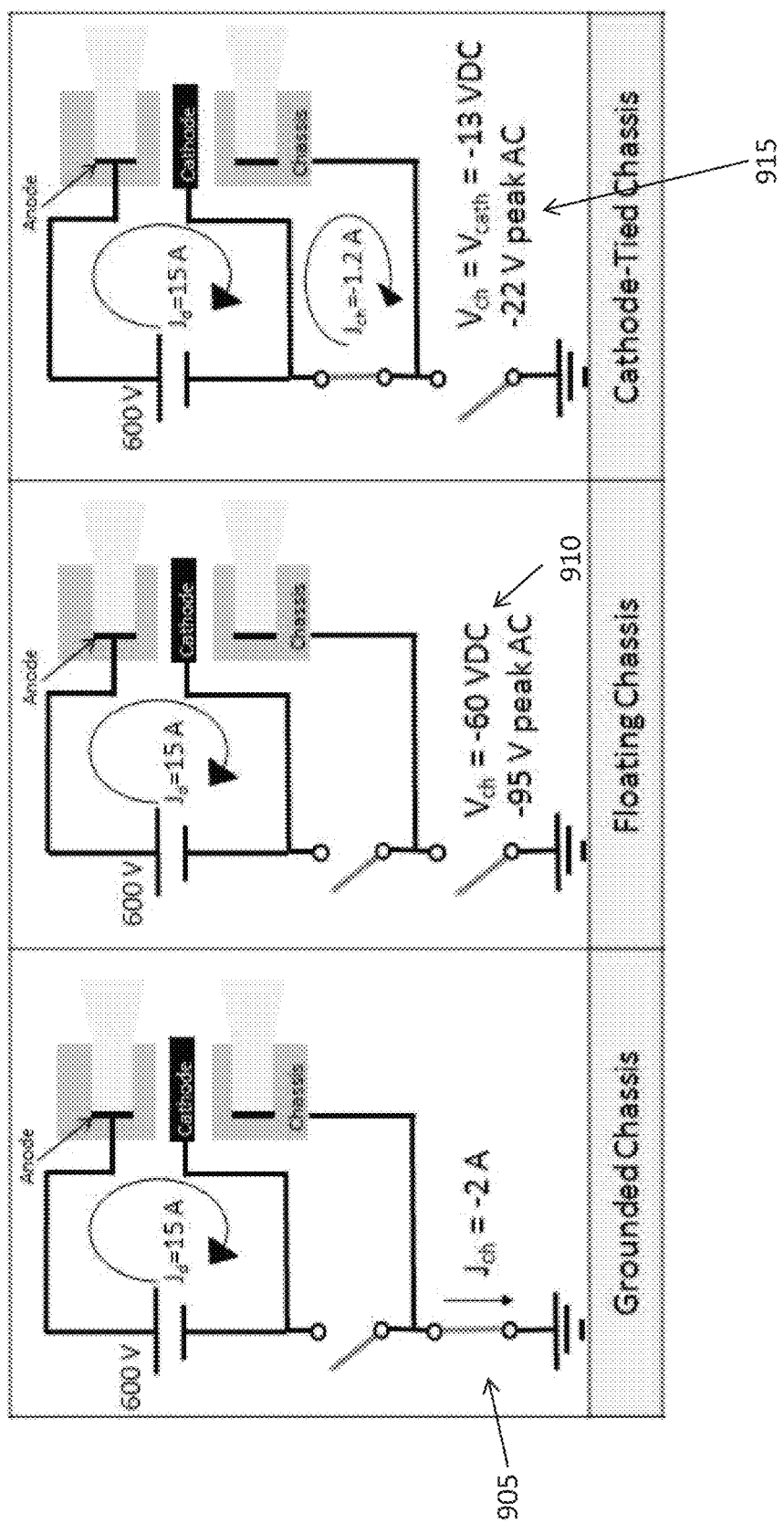
FIG. 9 illustrates testing electrical configurations.

In FIG. 9, the testing setups for three configurations are illustrated. In (905) the chassis is grounded; it should be noted that the parasitic current flowing through the vacuum chamber in the laboratory test to neutralize the beam would not be present in orbit. In (910) the chassis floats negative to reject the hot plasma contacting the poles. The higher ion energy significantly increases pole erosion. In (915) the current collected by the poles is recycled by the cathode; the ion energy is regulated by the cathode potential.

Figure 10:
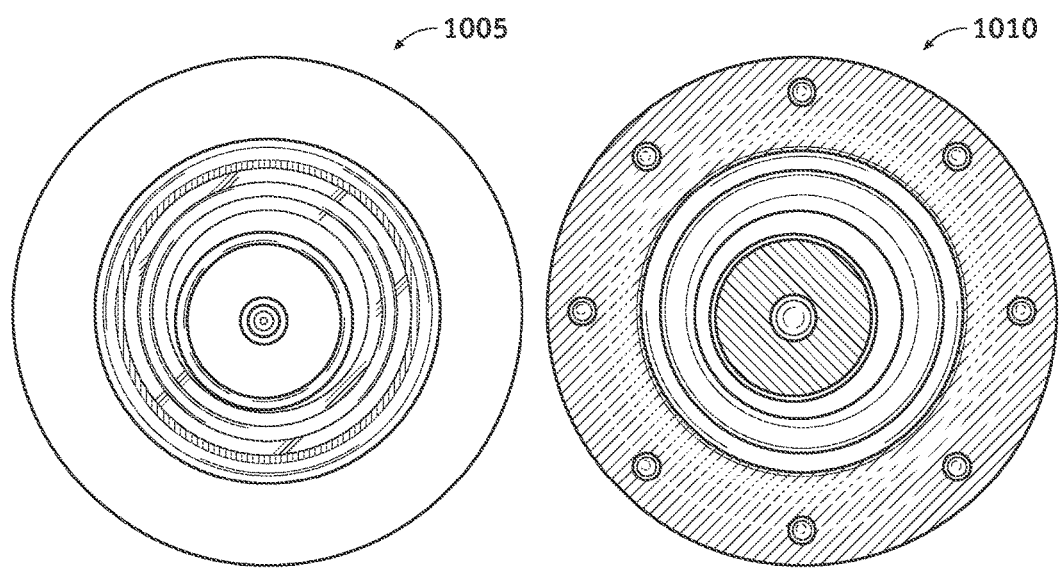
FIG. 10 illustrates covered and non-covered pole pieces.

FIG. 10 illustrates a thruster with pole covers (1005) and without covers (1010, the surfaces will be conducting).

The solar array electron current collection data, and the current voltage characteristics of the thruster body in the Hall thruster plasma are needed to predict cathode common potentials. Laboratory data was obtained for the magnetically shielded 6 kW H6MS Hall thruster, see Refs. [9,10] with a centrally mounted cathode operating at 300 V and 20 A. With the insulating pole piece surfaces, the ion current to the thruster body was relatively small, about 3 mA. This value may be much higher for externally mounted cathodes, particularly if the hollow cathode is mounted outside the thruster body and cathode ions have a direct line of sight to the body.

Figure 11:
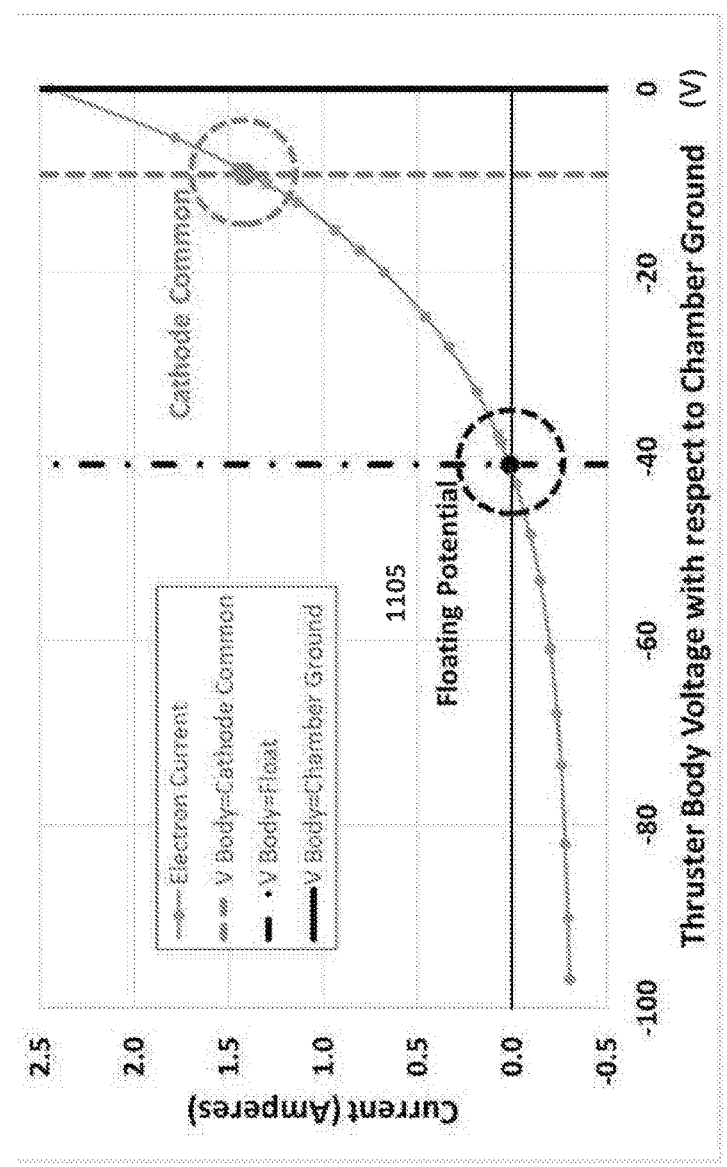
FIG. 11 illustrates an exemplary voltage-current characteristic of a Hall thruster body.

The current voltage characteristic of the thruster with conducting pole pieces, obtained by applying a DC bias to the thruster body, is shown in FIG. 11. The ion saturation current is about 300 mA, two orders of magnitude larger than with insulating surfaces on the pole pieces. It can be noted that, when the thruster body is connected to chamber ground, 2.5 A of electrons flow from the body to the chamber and help current neutralize the beam. This case is much different than during flight, where the main thrust beam ions must be current-neutralized by electrons flowing through the beam plasma. The floating potential (1105) of the thruster is about −40 V with respect to the chamber ground.

With conducting pole pieces, the ion currents to the thruster body are orders of magnitude larger than the electron currents collected by the solar arrays. As an example, a calculation for a notional spacecraft with four 9 kW Hall thrusters shows the solar arrays are expected to collect less than 10 mA of electrons, far less than the 300 mA of ion saturation current for a single 6 kW thruster. With a centrally mounted hollow cathode (215) or an external hollow cathode whose orifice is inside the magnetic field separatrix (210), the ion current to a Hall thruster body with insulating pole piece covers will be very small. In laboratory test the ion current to the body was only 3 mA. The ion current to the exposed conducting spacecraft surfaces will be also be very small, since most of such surfaces are behind the thruster exit plane where the plasma density is very low.

FIG. 6 illustrates a cathode common circuit for a Hall thruster with insulating pole piece surfaces. In this case, the spacecraft chassis ground will float negative with respect to the Hall plume plasma, so that only a portion of the solar array is positive and collects ions. An upper bound on the cathode common voltage is the resistive drop from the solar array electron collection across the isolation resistor, as shown in FIG. 6 as (605). Proper choice of the isolation resistance will limit the cathode common voltage. For the example above, a 1 kΩ resistor will limit cathode common to less than 10 V as shown in Eq. 1.

$$V=IR$$

$$I<I^{max}\approx 10\ mA$$

$$R=1\ k\Omega$$

$$V<10V \qquad (1)$$

A higher resistance will drive the spacecraft chassis ground more negative with respect to the plasma, and increase the cathode common voltage. Because ions are accelerated by sheath electric fields, a negative chassis potential leads to increased ion energies and therefore increased sputter erosion.

FIG. 7 illustrates a Hall thruster with conducting pole pieces where the current loop (705) through the thruster body (720) closes in the plume plasma (715). The ion currents to Hall thruster bodies with conducting pole pieces will be quite large. In laboratory tests with a centrally mounted cathode the saturation ion current to the body was about 300 mA. In this configuration, the currents to the thruster body dominate, and the thruster body acts like a floating probe as shown in FIG. 7. The thruster or chassis body is driven negative to repel electrons and balance the thruster-body ion current. Since the electron temperatures are high in the dense plasma above the inner pole piece, the floating potential can be about −40 V with respect to local plasma. The corresponding cathode common voltage, in this case the potential difference between the hollow cathode and the thruster body, can be +30 V.

During spaceflight, solar array current collection will not play a significant role. The thruster body ion current, about 300 mA, is much greater than the maximum solar array electron collection, which is typically less than 10 mA. For Hall thrusters with externally mounted cathodes where the cathode plume has unobstructed line of sight to the thruster-body metal (205), the thruster body will still tend to anchor the floating potential. However, in this case the voltages will be lower, of the order of 10 V, since the cathode plasma electron temperature is much lower than the temperature of the plasma next to the inner pole piece. If the isolation resistor (710) illustrated in FIG. 7 is 1 kΩ or larger, the isolation resistor will act as a voltage probe and will not affect the floating potential or the potential value of the cathode common.

In the first two configurations (1. an insulating surface on the pole pieces, and the thruster body electrically tied to the spacecraft chassis ground; and 2. exposed conducting pole pieces and the thruster body electrically tied to the spacecraft chassis ground), the thruster body surfaces can float tens of volts negative with respect to the inner pole plasma. In the first configuration with insulating pole piece surfaces, the thruster body potential can be controlled by the value of the isolation resistor. However, the insulating pole piece surfaces will reach floating potentials near in value to those of the thruster body of the second configuration. The negative floating potentials will lead to enhanced sputtering of pole pieces surfaces.

FIG. 8 illustrates current loops for a Hall thruster with conducting pole pieces and the thruster body at cathode common. This configuration allows the minimization of the voltage difference between the plasma and the pole pieces, thereby allowing decreased or no erosion of the pole pieces. In this third configuration, there are two separate circuits. In the first current loop (805), electrons are emitted from the hollow cathode (810), flow through the plasma, land on the pole pieces in the thruster body (815), and are conducted back to the hollow cathode. Laboratory measurements show that about 1.5 A of electrons are collected by the H6MS thruster body and flow through this circuit, less than 10% of the discharge current.

The second circuit (820) is very similar to the first configuration, where the pole pieces had insulating covers and the cathode common voltage is generated by the circuit current flowing through the isolation resistor. The difference is that now none of the ions hitting the thruster contribute to the circuit, compared to the 3 mA of ions in the first configuration. In the configurations without the isolation resistor, the 3 mA of ions cancelled out the same amount of electron current. In the third configuration, since the electron current flowing through the isolation resistor is increased, the spacecraft chassis ground is expected to float more negative with respect to the Hall plume plasma. Additionally, only a portion of the solar array floats positive. An approximate equation for the cathode common voltage is Eq. 2. As noted above, a 1 kΩ isolation resistor will limit the cathode common to 10 V.

$$V_{CC} \approx I_{max} R \left( \frac{V_{array} - V_{CC} - V_{HC}}{V_{array}} \right)^2 \qquad (2)$$

In Eq. (2), $V_{CC}$ is the cathode common voltage, $I_{max}$ is the maximum current that the solar array would collect from the plasma if the low side of the array were at plasma potential, R is the resistor isolating power supply from the low side of the solar array, $V_{array}$ is the solar array string voltage, $V_{HC}$ is the voltage drop internal to the hollow cathode.

In some embodiments, as illustrated in FIG. 2, the Hall thruster may comprise a thruster body comprising a housing, chassis or body comprising an annular discharge chamber (104) having an inner wall, the entire inner wall being made of an electrically conductive material and having a rear surface with an aperture (191) in the inner wall defined therein, said inner wall of said annular discharge chamber having a downstream end (191), a radially inner surface (192), and a radially outer surface (193), wherein said radially inner surface and said radially outer surface respectively radially inwardly and radially outwardly bound said annular discharge chamber.

The thruster may also comprise an anode/gas distributor (118) having an anode electrical terminal, said anode/gas distributor situated in said aperture defined in said rear surface of said annular discharge chamber, said anode/gas distributor having at least one inlet configured to receive an ionizable gas (120) and configured to distribute said ionizable gas for use as a propellant; a cathode neutralizer (102) configured to provide electrons, said cathode neutralizer having a cathode electrical terminal that can be connected to said anode electrical terminal by way of a power supply (116) and a switch, said cathode neutralizer and said anode/gas distributor when operating generating an axial electrical field within said annular discharge chamber, and a magnetic circuit having a magnetic yoke, an inner magnetic coil and an outer magnetic coil, said magnetic circuit to be energized by way of a power supply and a switch, said magnetic circuit configured to provide a substantially radial magnetic field across an annular aperture of said annular discharge chamber, said magnetic circuit configured to provide magnetic shielding of said inner wall of said annular discharge chamber from high-energy ions.

In other embodiments, the Hall thruster may also be unshielded instead of being magnetically shielded. In other embodiments, the annular discharge chamber can be either electrically conducting or insulating. In some embodiments, the chamber may comprise graphite covers (124) on the magnetic poles. The ferrous housing may also be termed as magnetic pole as it is part of the magnetic circuit when using electromagnets. In some embodiments, the cathode electrical terminal is electrically connected to the thruster body by way of an electrically conducting material, for example a conducting wire or other similar techniques. In some embodiments, the hollow cathode has a cylindrical hollow shape. In some embodiments, the magnetic shielding allows diversion of the high-energy ions away from the inner walls.

A number of embodiments of the disclosure have been described. Nevertheless; it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The references in the present application, shown in the reference list below, are incorporated herein by reference in their entirety.

REFERENCES

[1] Hofer, R. R., Joins, B. A., Polk, J. E., Mikellides, I. G., and Snyder, J. S., "Wear Test of a Magnetically Shielded Hall Thruster at 3000 Seconds Specific Impulse," Presented at the 33rd international Electric Propulsion Conference, IEPC-2013-033, Washington, D.C., Oct. 6-10, 2013.

[2] Mikellides, I. G., Katz, I., Hofer, R. R., and Goebel, D. M., "Magnetic Shielding of Walls from the Unmagnetized Ion Beam in a Hall Thruster," Applied Physics Letters 102, 2, 023509 (2013).

[3] Goebel, D. M., Jorns, B., Hofer, R. R., Mikellides, I. G., and Katz, I., "Pole-Piece Interactions with the Plasma in a Magnetically Shielded Hall Thruster," HIAA Paper 2014-3899, July 2014.

[4] Hofer, R. R. and Anderson, J. R., "Finite Pressure Effects in Magnetically Shielded Hall Thrusters," AIAA Paper 2014-3709, July 2014.

[5] Hofer, R. R., Goebel, D. M., Mikellides, L G., and Katz, I., "Magnetic Shielding of a Laboratory Hall Thruster Part II: Experiments," Journal of Applied Physics 115, 043303 (2014).

[6] Mikellides, I. G., Katz, I., Hofer, R. R., and Goebel, D. M., "Magnetic Shielding of a Laboratory Hall Thruster Part I: Theory and Validation," Journal of Applied Physics 115, 043303 (2014).

[7] Sekerak, M. J., Hofer, R. R., Polk, J. E., Jorns, B. A., and Mikellides, I. G., "Wear Testing of a Magnetically Shielded Hall Thruster at 2000 S Specific Impulse,"

Presented at the 34th International Electric Propulsion Conference, IEPC-2015-155, Kobe, Japan, Jul. 4-10, 2015

[8] Joins, B. A., Dodson, C., Anderson, J, Goebel, D. M., Hofer, R. R., Sekerak, M., Lopez Ortega, A., and Mikellides, I., "Mechanisms for Pole Piece Erosion in a 6-kW Magnetically-Shielded Hall Thruster," AIAA-2016-4839, July 2016.

[9] Katz, I., Lopez Ortega, A., Goebel, D. M., Sekerak, M. J., Hofer, R. R., Jorns, B. A., and Brophy, J. R., "Effect of Solar Array Plume Interactions on Hall Thruster Cathode Common Potentials," Presented at the 14th Spacecraft Charging Technology Conference, ESA/ESTEC, Noordwijk, N L, Apr. 4-8, 2016.

[10] Hofer, R., Polk, J., Sekerak, M., Mikellides, I., Kamhawi, H., Verhey, T., Herman, D., and Williams, G., "The 12.5 kW Hall Effect Rocket with Magnetic Shielding (HERMeS) for the Asteroid Redirect Robotic Mission," AIAA-2016-4825, July 2016.

[11] Hofer, R. R., "Magnetically-Conformed, Variable Area Discharge Chamber for Hall Thruster, and Method," U.S. Pat. No. 8,407,979 (Apr. 2, 2013).

[12] Manzella, D. H., Jacobson, D. T., Jankovsky, R. S., Hofer, R., and Peterson, P., "Magnetic Circuit for Hall Effect Plasma Accelerator," U.S. Pat. No. 7,624,566 (Dec. 1, 2009).

What is claimed is:

1. A Hall thruster, comprising: a thruster body comprising a conductive housing and further comprising an annular discharge chamber having an inner wall, the inner wall having a rear surface with an inner wall aperture in the inner wall defined therein, said inner wall of said annular discharge chamber having a downstream end, a radially inner surface, and a radially outer surface, wherein said radially inner surface and said radially outer surface respectively radially inwardly and radially outwardly bound said annular discharge chamber; an anode/gas distributor having an anode electrical terminal, said anode/gas distributor situated in said inner wall aperture defined in said rear surface of said annular discharge chamber, said anode/gas distributor having at least one inlet configured to receive an ionizable gas and configured to distribute said ionizable gas for use as a propellant; a cathode neutralizer configured to provide electrons, said cathode neutralizer having a cathode electrical terminal that can be connected to said anode electrical terminal by way of a first power supply and a switch, said cathode neutralizer and said anode/gas distributor when operating generating an axial electrical field within said annular discharge chamber; and a magnetic circuit having a magnetic yoke, an inner magnetic coil and an outer magnetic coil, said magnetic circuit configured to be switchably powered, said magnetic circuit configured to provide a substantially radial magnetic field across an annular aperture of said annular discharge chamber, wherein the cathode electrical terminal is electrically connected to the thruster body by way of a first electrically conductive material, thereby electrically biasing the thruster body to an electrical potential level of the cathode electrical terminal, wherein the Hall thruster is a magnetic layer Hall thruster.

2. The Hall thruster of claim 1, wherein said inner wall comprises a second electrically conductive material.

3. The Hall thruster of claim 1, wherein said inner wall comprises a first electrically insulating material.

4. The Hall thruster of claim 1, wherein an outer surface of the thruster body is covered in a second electrically conductive material.

5. The Hall thruster of claim 1, wherein an outer surface of the thruster body is covered in an insulating material.

6. The Hall thruster of claim 1, further comprising a second power supply interrupting the first electrically conductive material, the second power supply electrically connecting the cathode electrical terminal to the thruster body, thereby controlling an electrical potential level difference between the cathode electrical terminal and the thruster body.

7. The Hall thruster of claim 1, wherein the cathode neutralizer is placed inside a first region of magnetic field lines of the magnetic circuit which forms a boundary between a second region of the magnetic field lines where an electron is trapped by the magnetic field lines of the second region, and a third region of the magnetic field lines where the electron is not trapped.

8. The Hall thruster of claim 1, wherein the cathode neutralizer is placed outside a first region of magnetic field lines of the magnetic circuit which forms a boundary between a second region of the magnetic field lines where an electron is trapped by the magnetic field lines of the second region, and a third region of the magnetic field lines where the electron is not trapped.

9. The Hall thruster of claim 1, wherein the cathode neutralizer is placed centrally to the annular discharge chamber.

10. The Hall thruster of claim 1, wherein the magnetic circuit is configured to provide magnetic shielding of said inner wall of said annular discharge chamber from high-energy ions.

11. The Hall thruster of claim 3, wherein an outer surface of the thruster body is covered in a second electrically conductive material, and the magnetic circuit is configured to provide magnetic shielding of said inner wall of said annular discharge chamber from high-energy ions.

12. The Hall thruster of claim 3, wherein an outer surface of the thruster body is covered in a second electrically insulating material, and the magnetic circuit is configured to provide magnetic shielding of said inner wall of said annular discharge chamber from high-energy ions.

13. The Hall thruster of claim 3, wherein an outer surface of the thruster body is covered in a second electrically insulating material.

14. The Hall thruster of claim 2, wherein an outer surface of the thruster body is covered in a third electrically conductive material, and the magnetic circuit is configured to provide magnetic shielding of said inner wall of said annular discharge chamber from high-energy ions.

15. The Hall thruster of claim 11, further comprising a second power supply interrupting the first electrically conductive material, the second power supply electrically connecting the cathode electrical terminal to the thruster body, thereby controlling an electrical potential level difference between the cathode electrical terminal and the thruster body.

16. The Hall thruster of claim 12, further comprising a second power supply interrupting the first electrically conductive material, the second power supply electrically connecting the cathode electrical terminal to the thruster body, thereby controlling an electrical potential level difference between the cathode electrical terminal and the thruster body.

17. The Hall thruster of claim 13, further comprising a second power supply interrupting the first electrically conductive material, the second power supply electrically connecting the cathode electrical terminal to the thruster body, thereby controlling an electrical potential level difference between the cathode electrical terminal and the thruster body.

18. The Hall thruster of claim 14, further comprising a second power supply interrupting the first electrically conductive material, the second power supply electrically connecting the cathode electrical terminal to the thruster body, thereby controlling an electrical potential level difference between the cathode electrical terminal and the thruster body.

* * * * *